P. RUSSELL.
Hay-Gatherer.

No. 166,560. Patented Aug. 10, 1875.

WITNESSES:

Perry Russell
INVENTOR.

UNITED STATES PATENT OFFICE.

PERRY RUSSELL, OF JEFFERSON, ILLINOIS.

IMPROVEMENT IN HAY-GATHERERS.

Specification forming part of Letters Patent No. 166,560, dated August 10, 1875; application filed June 24, 1875.

*To all whom it may concern:*

Be it known that I, PERRY RUSSELL, of Jefferson, Cook county, State of Illinois, have invented a new and useful Hay-Gatherer, of which the following is a full description, reference being had to the accompanying drawings, in which—

Figure 1:
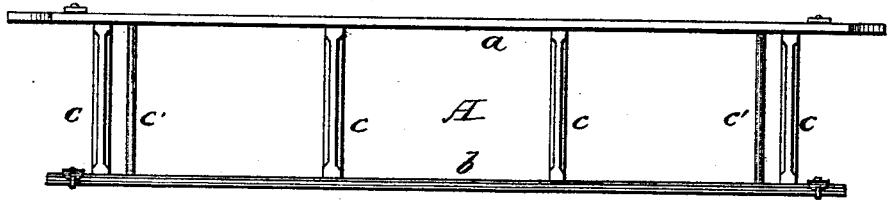
Figure 2:
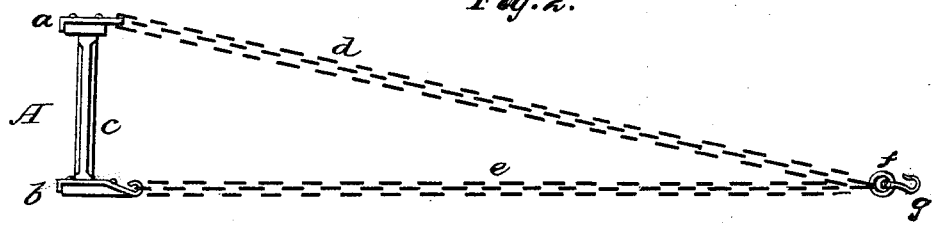

Figure 1 is a front elevation. Fig. 2 is an end view.

The object of my invention is to construct an implement to facilitate the stacking of hay. This has always been done by first loading the hay onto a wagon, or other receptacle for it, and then pitching it onto the stack.

By the use of my improvement the hay, having first been placed in tumbles or cocks, in the usual way, can be drawn directly to the stack, without first being loaded upon a wagon.

The invention consists of a frame, to each end of which chains are attached, to which horses are connected when in use. I use two horses, one for each end of the frame; the horses passing one on each side of the row of tumbles or cocks.

The device can be used to take up hay in windrows; but I find it better to first put it into tumbles or cocks, as usual.

In the drawings, A represents the frame, consisting of two pieces, $a\ b$, and uprights $c$ $c\ c\ c$, properly secured thereto. $a$ and $b$ should be about thirteen feet long. $a$ may be two inches thick and six inches wide. $b$ may be two inches thick and eight inches wide. The front edge of $b$ should be beveled, as shown. $a$ and $b$ should be about two feet six inches apart. $c$ represent connecting-bars of wood. $c'$ are metal rods; a greater number than shown can be used.

At each end of $a$ is properly secured a chain, $d$. At each end of $b$ is secured a chain, $e$. The chains $d$ should be about eleven feet two and a half inches long, and the lower chains $e$ should be each about ten feet and ten inches long. These chains $d\ e$ upon each end are to be brought together at $f$, where a hook, $g$, or other device, is to be placed to receive a whiffletree, one on each side or end of the device.

In use, attach a horse upon each side at $g$, place the frame A upright, and when it comes in contact with a cock or tumble it will maintain its upright position without assistance. The horses are to pass one on each side of a row of tumbles or cocks, which will be gathered up one after another, and held by the frame until as much has been taken up as the horses can conveniently draw, which quantity can be drawn upon the ground directly to the stack without being loaded onto a wagon, and will not be scattered. I usually take up about fifteen hundred pounds each time in this way.

I find it desirable to construct the device substantially as described in all respects. If the relative length of the chains be much varied, the frame will either slide over the hay or will tip forward.

What I claim as new, and desire to secure by Letters Patent, is as follows:

The frame A, consisting of two or more longitudinal bars, suitably connected together, in combination with chains $d\ e$ at each end, all constructed and operating substantially as and for the purpose specified.

PERRY RUSSELL.

Witnesses:
E. A. WEST,
O. W. BOND.